United States Patent

Saldana, Sr.

[11] Patent Number: 5,690,420
[45] Date of Patent: Nov. 25, 1997

[54] UPWARDLY PROJECTING INDICATOR LIGHT

[76] Inventor: Andres B. Saldana, Sr., P.O. Box 201, Ontario, Calif. 91762

[21] Appl. No.: 591,423

[22] Filed: Jan. 19, 1996

[51] Int. Cl.[6] ............................................. F21V 21/28
[52] U.S. Cl. ...................... 362/275; 362/61; 362/285; 362/419; 362/427
[58] Field of Search ............................ 362/61, 66, 71, 362/275, 285, 287, 418, 419, 401, 402, 427

[56] References Cited

U.S. PATENT DOCUMENTS

| | | | |
|---|---|---|---|
| 536,759 | 4/1895 | Potter | 362/401 |
| 4,480,809 | 11/1984 | Healey | 362/371 |
| 4,884,173 | 11/1989 | Cassidy | 362/61 |
| 4,999,757 | 3/1991 | Poppenheimer | 362/287 |
| 5,335,149 | 8/1994 | Evans | 362/61 |
| 5,450,303 | 9/1995 | Markiewicz et al. | 362/419 |
| 5,481,443 | 1/1996 | Wagner et al. | 362/287 |

Primary Examiner—Alan Cariaso

[57] ABSTRACT

A light for indicating a location of a vehicle. The inventive device includes a spotlight for creating a directed beam of illumination. A gimbal supports the spotlight relative to the vehicle such that the beam is always directed vertically upward for indicating a presence of the associated vehicle.

15 Claims, 3 Drawing Sheets

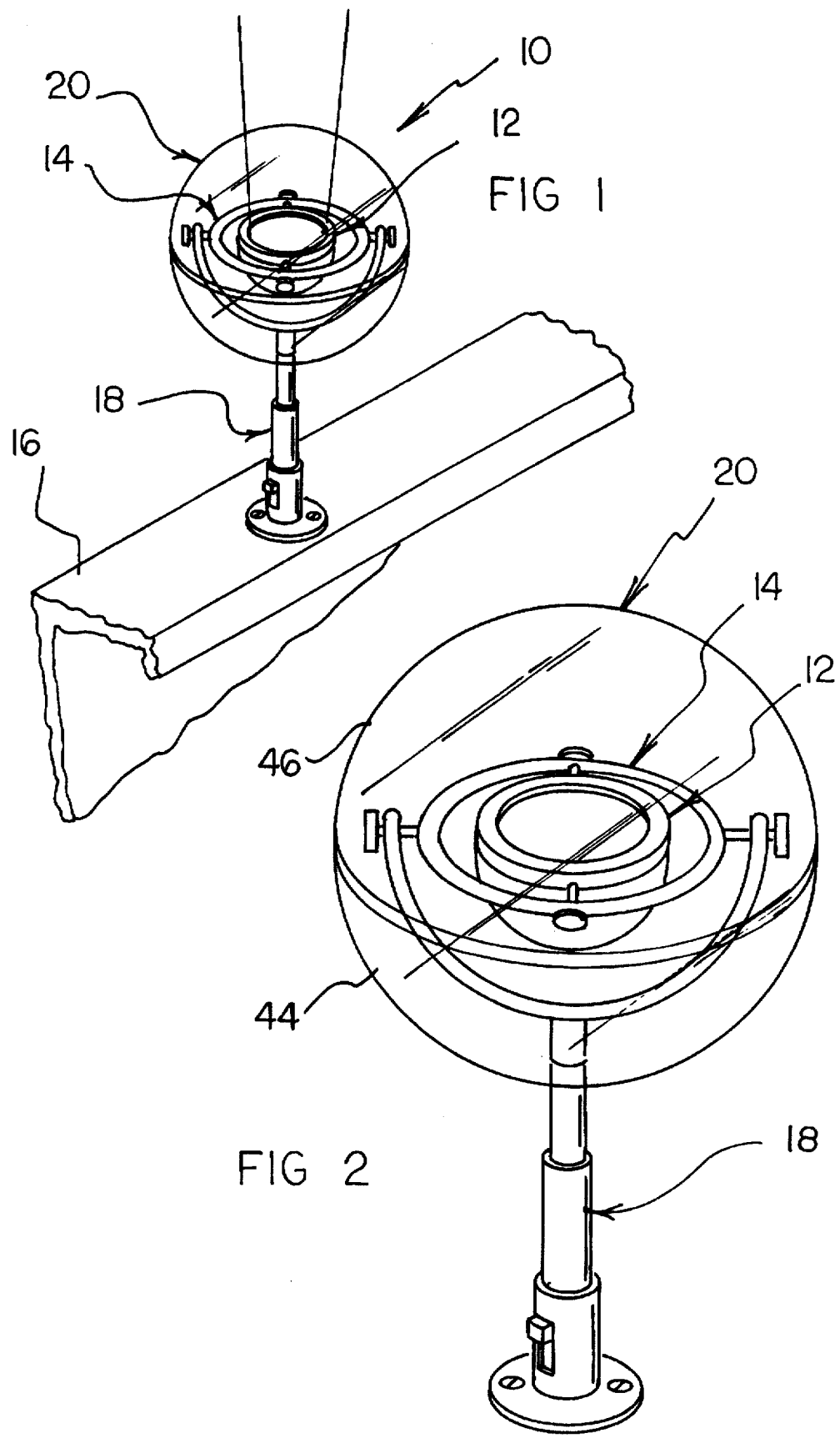

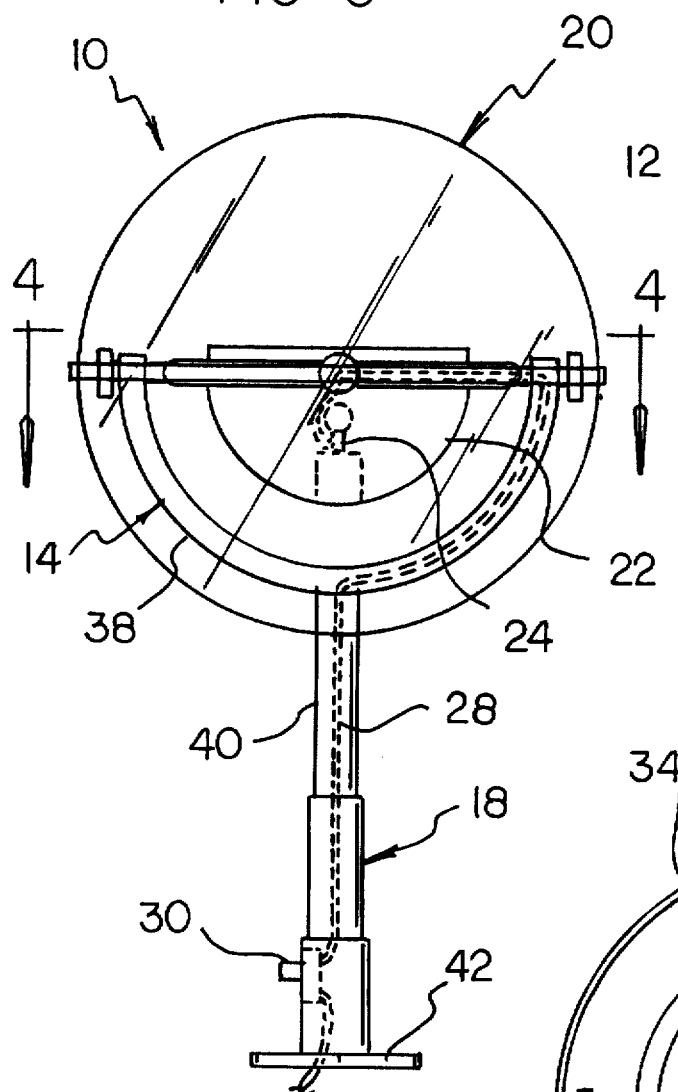
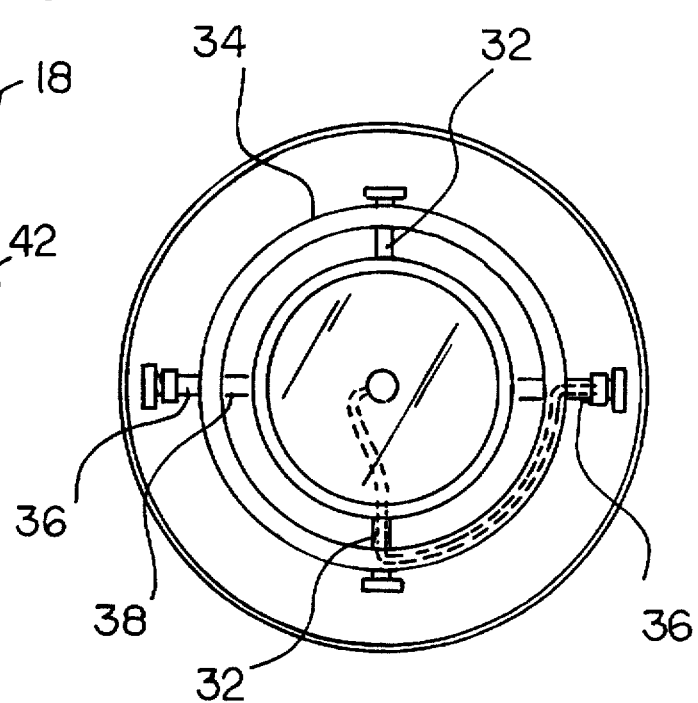

UPWARDLY PROJECTING INDICATOR LIGHT

BACKGROUND OF THE INVENTION

1. Field of the Invention

The present invention relates to illuminated indicators and more particularly pertains to an upwardly projecting indicator light for indicating a location of a vehicle.

2. Description of the Prior Art

The use of illuminated indicators is known in the prior art. More specifically, illuminated indicators heretofore devised and utilized are known to consist basically of familiar, expected and obvious structural configurations, notwithstanding the myriad of designs encompassed by the crowded prior art which have been developed for the fulfillment of countless objectives and requirements.

Known prior art illuminated indicators include U.S. Pat. Nos. 4,480,809; 3,086,107; 3,505,515; 3,786,243; 4,196,821; and Des. 295,326.

While these devices fulfill their respective, particular objectives and requirements, the aforementioned patents do not disclose an upwardly projecting indicator light for indicating a location of a vehicle which includes a spotlight for creating a directed beam of illumination, and a gimbal supporting the spotlight relative to the vehicle such that the beam is always directed vertically upward for indicating a presence of the associated vehicle.

In these respects, the upwardly projecting indicator light according to the present invention substantially departs from the conventional concepts and designs of the prior art, and in so doing provides an apparatus primarily developed for the purpose of indicating a location of a vehicle.

SUMMARY OF THE INVENTION

In view of the foregoing disadvantages inherent in the known types of illuminated indicators now present in the prior art, the present invention provides a new upwardly projecting indicator light construction wherein the same can be utilized for indicating a location of a vehicle. As such, the general purpose of the present invention, which will be described subsequently in greater detail, is to provide a new upwardly projecting indicator light apparatus and method which has many of the advantages of the illuminated indicators mentioned heretofore and many novel features that result in an upwardly projecting indicator light which is not anticipated, rendered obvious, suggested, or even implied by any of the prior art illuminated indicators, either alone or in any combination thereof.

To attain this, the present invention generally comprises a light for indicating a location of a vehicle. The inventive device includes a spotlight for creating a directed beam of illumination. A gimbal supports the spotlight relative to the vehicle such that the beam is always directed vertically upward for indicating a presence of the associated vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new upwardly projecting indicator light apparatus and method which has many of the advantages of the illuminated indicators mentioned heretofore and many novel features that result in an upwardly projecting indicator light which is not anticipated, rendered obvious, suggested, or even implied by any of the prior art tool guides, either alone or in any combination thereof.

It is another object of the present invention to provide a new upwardly projecting indicator light which may be easily and efficiently manufactured and marketed.

It is a further object of the present invention to provide a new upwardly projecting indicator light which is of a durable and reliable construction.

An even further object of the present invention is to provide a new upwardly projecting indicator light which is susceptible of a low cost of manufacture with regard to both materials and labor, and which accordingly is then susceptible of low prices of sale to the consuming public, thereby making such upwardly projecting indicator lights economically available to the buying public.

Still yet another object of the present invention is to provide a new upwardly projecting indicator light which provides in the apparatuses and methods of the prior an some of the advantages thereof, while simultaneously overcoming some of the disadvantages normally associated therewith.

Still another object of the present invention is to provide a new upwardly projecting indicator light for indicating a location of a vehicle.

Yet another object of the present invention is to provide a new upwardly projecting indicator light which includes a spotlight for creating a directed beam of illumination, and a gimbal supporting the spotlight relative to the vehicle such that the beam is always directed vertically upward for indicating a presence of the associated vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of an upwardly projecting indicator light according to the present invention in use.

FIG. 2 is an isometric illustration of the invention, per se.

FIG. 3 is an elevation view thereof.

FIG. 4 is a cross-sectional view taken along line 4—4 of FIG. 3.

DESCRIPTION OF THE PREFERRED EMBODIMENT

Figure 5:
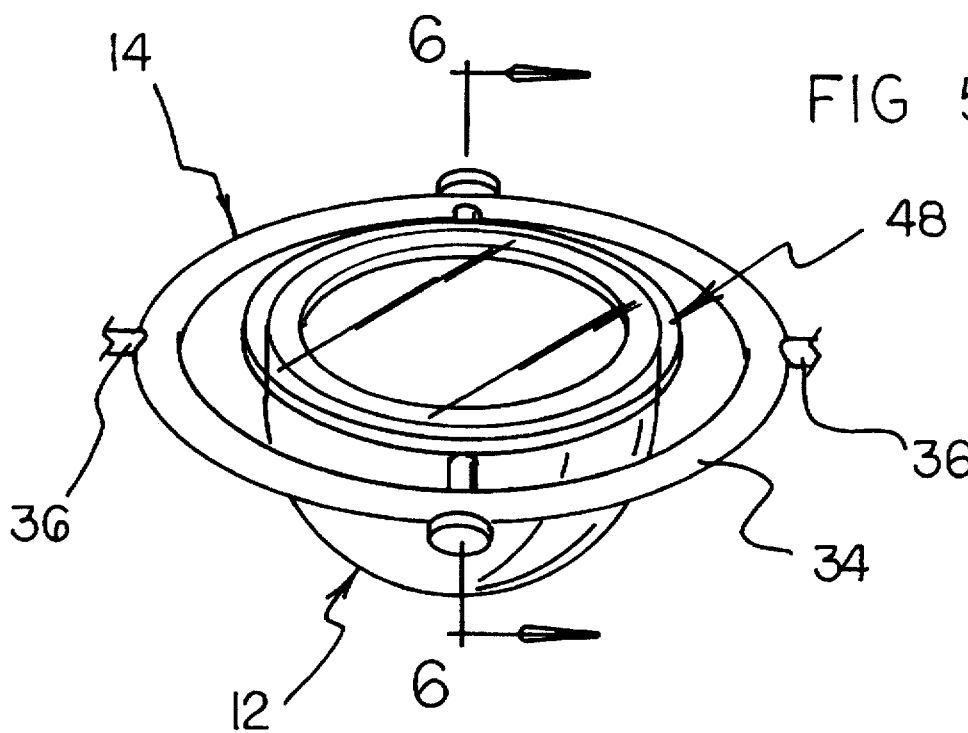
FIG. 5 is an isometric illustration of a portion of the present invention.

With reference now to the drawings, and in particular to FIGS. 1–6 thereof, a new upwardly projecting indicator light embodying the principles and concepts of the present invention and generally designated by the reference numeral 10 will be described.

More specifically, it will be noted that the upwardly projecting indicator light 10 comprises a spotlight 12 for creating a directed beam of illumination, as shown in FIG. 1 of the drawings. The spotlight 12 is supported within a gimbal 14 relative to a support surface 16 of an associated vehicle such that the spotlight 12 projects the beam of illumination vertically upwardly regardless of an orientation of the associated vehicle. By this structure, the vehicle can be easily spotted from a remote distance as a result of the vertically projecting beam of illumination.

With continuing reference to FIGS. 1 and 2, it can be shown that the present invention 10 may further comprise a mounting means 18 for mounting the gimbal 14 relative to the support surface 16 of the associated vehicle. Further, a transparent enclosure 20 can be secured to the mounting means 18 for enclosing both the gimbal 14 and the supported spotlight 12.

Figure 6:
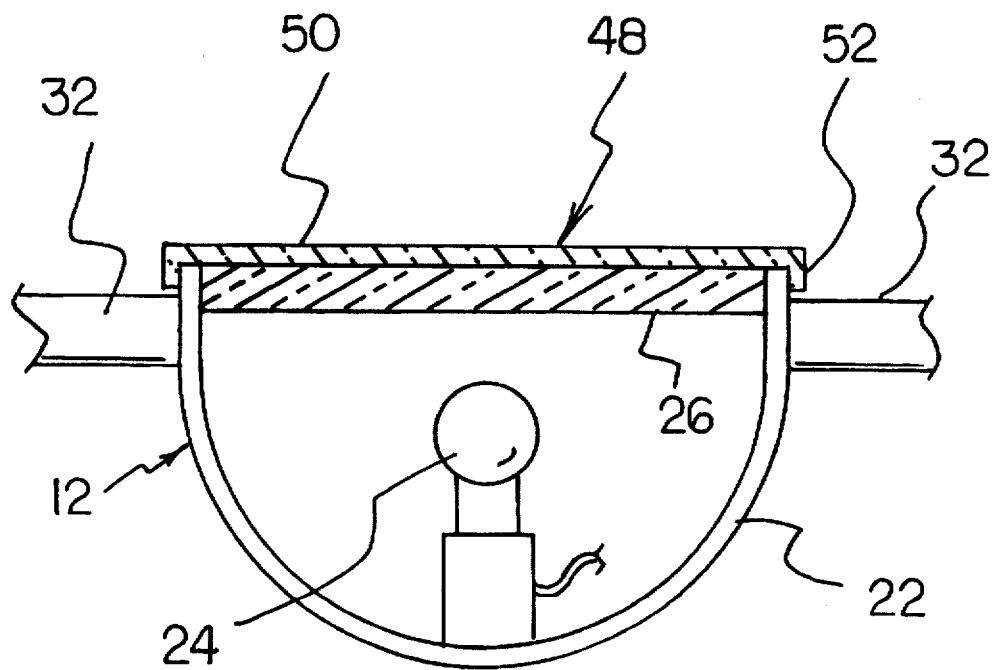
FIG. 6 is a cross-sectional view taken along line 6—6 of FIG. 5.

Referring now to FIGS. 3 through 6 wherein the present invention 10 is illustrated in detail, it can be shown that the spotlight 12 of the present invention 10 preferably comprises a parabolic reflector housing 22 having a light bulb 24 mounted centrally therewithin. As shown in FIG. 6, a spotlight lens 26 extends across an open upper end of the parabolic reflector housing 22 so as to enclose the light bulb 24 therewithin. The light bulb 24 is energized by electrical wires 28 extended through the gimbal 14 and through the mounting means 18 as shown in FIG. 3 of the drawings. The wires 28 can be electrically coupled to a switch 30 for permitting selective manual energization of the spotlight 12 as desired by an end user.

With continuing reference to FIGS. 3 through 6, it can be shown that the gimbal 14 of the present invention 10 preferably comprises a pair of spotlight axles 32 which are colinearly oriented relative to one another and project from diametrically opposed sides of the parabolic reflector housing 22 of the spotlight 12, as shown in FIG. 4 of the drawings. The spotlight axles 32 are rotatably mounted to diametrically opposed portions of an annular support ring 34 so as to permit pivoting articulation of the spotlight 12 about a first horizontal axis directed through the spotlight axles 32. The support ring 34 includes oppositely projecting and colinearly oriented support ring axles 36 projecting from diametrically opposed exterior portions thereof which are pivotally mounted to a support yoke 38. The support ring axles 36 support the support ring 34 for pivoting about a second horizontal axis oriented substantially orthogonally relative to the first horizontal axis. The support yoke 38 can thus be mounted relative to a support surface 16 of an associated vehicle, whereby the spotlight 12 will assume a vertical orientation regardless of an orientation of the associated vehicle.

As best illustrated in FIG. 3, it can be shown that the mounting means 18 of the present invention 10 preferably comprises a telescoping stanchion 40 secured to a center portion of the support yoke 38 and projecting therefrom. A base plate 42 is secured to a lower end of the telescoping stanchion 40 and can be mounted to the support surface 16 by threaded fasteners or the like directed through the base plate 42 and into the support surface. The telescoping stanchion 40 may be of a fixed longitudinal length, or alternatively may comprise a plurality of concentrically positioned tubes which can be telescopingly extended relative to one another and frictionally locked into an extended position as shown in FIG. 3 of the drawings. The switch 30 can be mounted within a lower portion of the telescoping stanchion 40 for convenient operation by an end user of the device 10.

As best illustrated in FIG. 2, it can be shown that the transparent enclosure 20 of the present invention 10 preferably comprises a lower hemi-spherical dome 44 receiving the gimbal 14 and the spotlight 12 therewithin, with the mounting means 18 projecting through an unlabelled center aperture of the lower hemi-spherical dome 44 for coupling with the support yoke 38 of the gimbal 14. An upper hemi-spherical dome 46 includes an unlabelled annular coupling flange which frictionally or otherwise securely engages with the lower hemi-spherical dome 44 so as to complete the transparent enclosure 20 illustrated in the drawings. By this structure, the gimbal 14 and the spotlight 12 are protected from the weather or like elements.

As shown in FIGS. 5 and 6, the present invention 10 may further comprise a modifier lens 48 removably coupled to the spotlight 12 for coloring or modifying the beam of illumination directed from the spotlight 12 during use of the device 10. To this end, and as best illustrated in FIG. 6, the modifier lens 48 preferably comprises a translucent panel 50 sized to be positioned over the spotlight lens 26 of the spotlight 12. The modifier lens 48 further includes a depending perimeter flange 52 projecting downwardly from an outer peripheral edge of the translucent panel 50 which can be circumferentially positioned about an outer exterior edge of the parabolic reflector housing 22. The depending perimeter flange 52 may simply frictionally engage with the outer exterior portion of the parabolic reflector housing 22 so as to retain the modifier lens 48 relative thereto. By this structure, the beam of illumination directed from the spotlight 12 during use of the device 10 can be modified to a desired color or diffused in a desired direction.

In use, the upwardly projecting indicator light 10 of the present invention can be easily utilized for directing a beam of illumination in a constantly vertically upwardly projecting orientation relative to a vehicle regardless of a positioning of the associated vehicle. The present invention 10 thus permits remote individuals to view and identify the associated vehicle from a predetermined distance.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An upwardly projecting indicator light comprising: a spotlight for creating a directed beam of illumination;
   a gimbal securable to a support surface, the spotlight being supported within the gimbal such that the spotlight projects the directed beam of illumination vertically upwardly regardless of an orientation of the support surface;
   a mounting means for mounting the gimbal relative to the support surface;
   a transparent enclosure secured to the mounting means and enclosing both the gimbal and the supported spotlight; and
   the spotlight having a parabolic reflector housing having a light bulb mounted centrally therewithin; and a spotlight lens extending across an open upper end of the parabolic reflector housing so as to enclose the light bulb therewithin.

2. The upwardly projecting indicator light of claim 1, wherein the gimbal comprises a pair of spotlight axles colinearly oriented relative to one another and projecting from diametrically opposed sides of the parabolic reflector housing of the spotlight; an annular support ring, the spotlight axles being rotatably mounted to diametrically opposed portions of the annular support ring so as to permit pivoting articulation of the spotlight about a first horizontal axis directed through the spotlight axles, the support ring including oppositely projecting and colinearly oriented support ring axles projecting from diametrically opposed exterior portions thereof; a support yoke, the support ring axles being pivotally mounted to the support yoke, with the support ring axles mounting the support ring for pivoting about a second horizontal axis oriented substantially orthogonally relative to the first horizontal axis.

3. The upwardly projecting indicator light of claim 2, wherein the mounting means comprises a stanchion secured to a center portion of the support yoke and projecting therefrom; and a base plate secured to a lower end of the stanchion which can be mounted to the support surface.

4. The upwardly projecting indicator light of claim 3, wherein the stanchion comprises a telescoping stanchion including a plurality of concentrically positioned tubes telescopingly extendable relative to one another and frictionally engaged to one another.

5. The upwardly projecting indicator light of claim 4, wherein the transparent enclosure comprises a lower hemi-spherical dome receiving the gimbal and the spotlight therewithin, the mounting means projecting through a center aperture of the lower hemi-spherical dome; and an upper hemi-spherical dome removably coupled to the lower hemi-spherical dome.

6. The upwardly projecting indicator light of claim 5, wherein the upper hemi-spherical dome includes an annular coupling flange which engages with the lower hemi-spherical dome so as to removably couple the upper hemi-spherical dome to the lower hemi-spherical dome.

7. The upwardly projecting indicator light of claim 6, and further comprising a modifier lens removably coupled to the spotlight for modifying the beam of illumination directed from the spotlight.

8. The upwardly projecting indicator light of claim 7, wherein the modifier lens comprises a translucent panel positioned over the spotlight lens of the spotlight, the modifier lens further including a depending perimeter flange projecting downwardly from an outer peripheral edge of the translucent panel which is circumferentially positioned about an outer exterior edge of the parabolic reflector housing.

9. An upwardly projecting indicator light comprising:
   a vehicle having a support surface;
   a spotlight for creating a directed beam of illumination, the spotlight having a parabolic reflector housing having a light bulb mounted centrally therewithin, and a spotlight lens extending across an open upper end of the parabolic reflector housing so as to enclose the light bulb therewithin;
   a gimbal secured to the support surface, the spotlight being supported within the gimbal such that the spotlight projects the directed beam of illumination vertically upwardly regardless of an orientation of the support surface, the gimbal comprises a pair of spotlight axles collinearly orientated relative to one another and projecting from diametrically opposed sides of the parabolic reflector housing of the spotlight; and
   an annular support ring, the spotlight axles being rotatably mounted to diametrically opposed portions of the annular support ring so as to permit pivoting articulation of the spotlight about a first horizontal axis directed through the spotlight axles, the support ring including oppositely projecting and collinearly oriented support ring axles projecting from diametrically opposed exterior portions thereof; a support yoke, the support ring axles being pivotally mounted on the support yoke, with the support ring axles mounting the support ring for pivoting about a second horizontal axis oriented substantially orthogonally relative to the first horizontal axis.

10. The upwardly projecting indicator light of claim 9, and further comprising a mounting means for mounting the gimbal relative to the support surface.

11. The upwardly projecting indicator light of claim 10, and further comprising a transparent enclosure secured to the mounting means and enclosing both the gimbal and the supported spotlight.

12. The upwardly projecting indicator light of claim 11, wherein the mounting means comprises a stanchion secured to a center portion of the support yoke and projecting therefrom; and a base plate secured to a lower end of the stanchion which can be mounted to the support surface.

13. The upwardly projecting indicator light of claim 12, wherein the stanchion comprises a telescoping stanchion including a plurality of concentrically positioned tubes telescopingly extendable relative to one another and frictionally engaged to one another.

14. The upwardly projecting indicator light of claim 13, wherein the transparent enclosure comprises a lower hemi-spherical dome receiving the gimbal and the spotlight therewithin, the mounting means projecting through a center aperture of the lower hemi-spherical dome; and an upper hemi-spherical dome removably coupled to the lower hemi-spherical dome.

15. The upwardly projecting indicator light of claim 14, wherein the upper hemi-spherical dome includes an annular coupling flange which engages with the lower hemi-spherical dome so as to removably couple the upper hemi-spherical dome to the lower hemi-spherical dome.

* * * * *